United States Patent
Mineif

(10) Patent No.: US 9,623,483 B2
(45) Date of Patent: Apr. 18, 2017

(54) POWDER-METALLURGICAL BODY AND METHOD FOR THE PRODUCTION THEREOF

(71) Applicant: PMG FUESSEN GMBH, Fuessen (DE)

(72) Inventor: Rudolf Mineif, Fuessen (DE)

(73) Assignee: PMG Fuessen GmbH, Fuessen (DE)

( * ) Notice: Subject to any disclaimer, the term of this patent is extended or adjusted under 35 U.S.C. 154(b) by 390 days.

(21) Appl. No.: 14/230,782

(22) Filed: Mar. 31, 2014

(65) Prior Publication Data

US 2014/0304974 A1   Oct. 16, 2014

Related U.S. Application Data

(62) Division of application No. 13/203,511, filed as application No. PCT/DE2010/000198 on Feb. 24, 2010, now abandoned.

(30) Foreign Application Priority Data

Feb. 26, 2009   (DE) .................. 10 2009 010 371

(51) Int. Cl.
*B22F 3/24* (2006.01)
*B22F 7/00* (2006.01)
*B22F 3/11* (2006.01)
*F16J 15/06* (2006.01)
*B23P 17/04* (2006.01)

(52) U.S. Cl.
CPC ............ *B22F 7/002* (2013.01); *B22F 3/1109* (2013.01); *B22F 3/24* (2013.01); *B23P 17/04* (2013.01); *F16J 15/062* (2013.01); *B22F 2003/1106* (2013.01); *Y10T 29/49* (2015.01); *Y10T 29/4998* (2015.01); *Y10T 428/12042* (2015.01)

(58) Field of Classification Search
None
See application file for complete search history.

(56) References Cited

U.S. PATENT DOCUMENTS

| | | | |
|---|---|---|---|
| 4,483,820 A | 11/1984 | Schelb | |
| 5,453,242 A | 9/1995 | Knoess | |
| 6,017,489 A | 1/2000 | Woolf et al. | |
| 6,419,876 B1 * | 7/2002 | Cadle ..................... | B22F 3/24 419/2 |
| 6,899,846 B2 | 5/2005 | Woolf | |
| 7,310,876 B2 * | 12/2007 | May ..................... | F16F 9/3214 188/322.22 |
| 2004/0177719 A1 | 9/2004 | Kosco | |
| 2006/0073062 A1 | 4/2006 | Naumann et al. | |
| 2006/0159376 A1 | 7/2006 | Takayama et al. | |

FOREIGN PATENT DOCUMENTS

| | | |
|---|---|---|
| CN | 1903482 A | 1/2007 |
| CN | 101069961 A | 11/2007 |
| DE | 4211319 C2 | 10/1993 |
| DE | 10301175 A1 | 7/2004 |
| DE | 60007857 A1 | 12/2004 |
| DE | 202008001976 U1 | 7/2008 |
| WO | 2004065044 A1 | 8/2004 |

* cited by examiner

*Primary Examiner* — Jessee Roe
*Assistant Examiner* — Ngoclan T Mai
(74) *Attorney, Agent, or Firm* — Laurence A. Greenberg; Werner H. Stemer; Ralph E. Locher

(57) ABSTRACT

A powder-metallurgical body and a method for producing such a body. The powder-metallurgical body is formed with a seating base for seating a sealing element to produce a seal with respect to fluids, such as liquids and/or gases. The body is redensified in a low-lying depth region of the seating base.

23 Claims, 3 Drawing Sheets

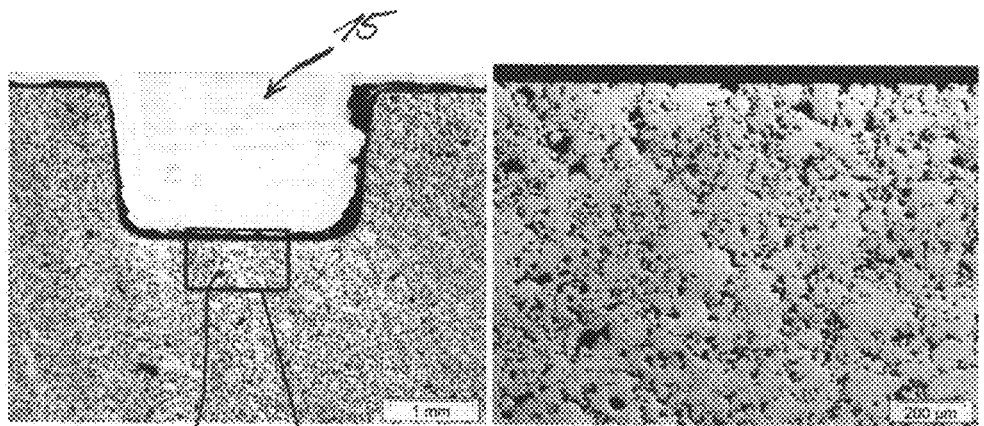
FIG. 4
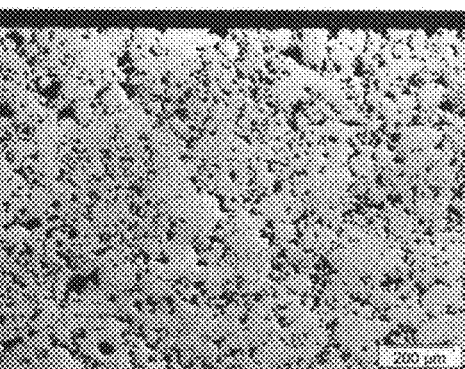
FIG. 5
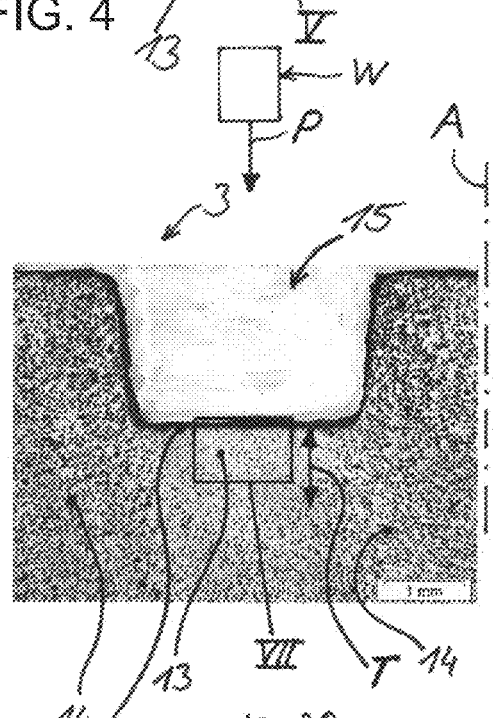
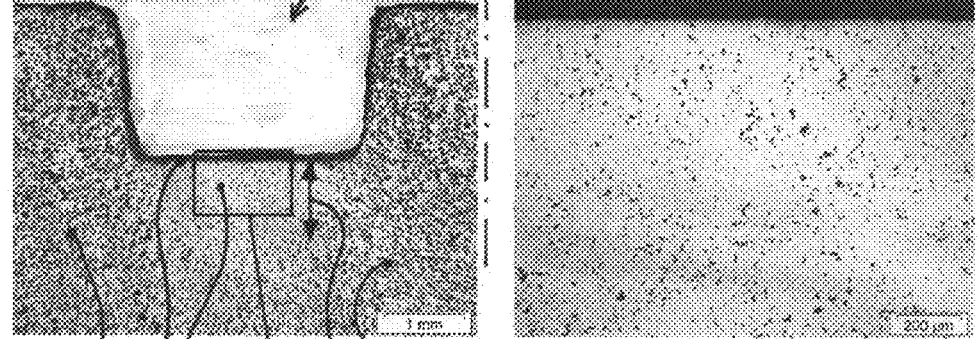
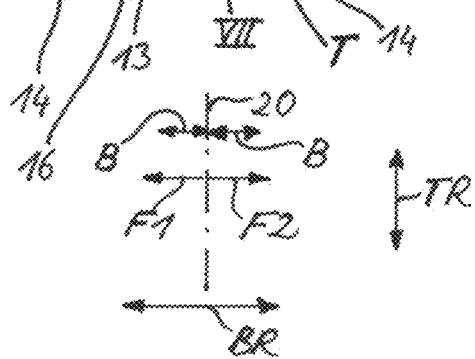
FIG. 7
FIG. 6

POWDER-METALLURGICAL BODY AND METHOD FOR THE PRODUCTION THEREOF

CROSS-REFERENCE TO RELATED APPLICATION

This application is a divisional, under 35 U.S.C. §120, of copending application Ser. No. 13/203,511, now abandoned which was a §371 national stage of international patent application PCT/DE2010/000198, filed Feb. 24, 2010, which claimed priority, under 35 U.S.C. §119, to German patent application DE 10 2009 010 371.6, filed Feb. 26, 2009; the prior applications are herewith incorporated by reference in their entirety.

BACKGROUND OF THE INVENTION

Field of the Invention

The invention relates to a powder-metallurgical body and to a method for producing a powder-metallurgical body.

German published patent application DE 103 01 175 A1 describes a body which is produced by powder metallurgy and has at least one porous region and at least one areal fluid-tight region. The fluid-tight region is intended to be impervious to certain liquids and, under certain circumstances, should also be impervious to gases. Such a fluid-tight region can form a barrier within the body.

BRIEF SUMMARY OF THE INVENTION

The invention is based on the object of improving the sealing function of a powder-metallurgical body. The object is achieved by the combination of features recited in the claims.

The invention is based on the concept of seating a separate sealing element (e.g. an elastomer seal) on a powder-metallurgical body—preferably made of sintered iron or sintered steel—and of combining the sealing function of said sealing element with a redensified body region. The sealing element has the function of sealing a wall of the body with respect to the undesirable penetration of gases and/or liquids. This sealing function is improved in that the sealing element is seated on a seating base of the body and the powder-metallurgical body has a redensified depth region in the region of the seating base. The depth region therefore has a lower mean porosity (consequently a higher material density) than the body as a whole.

The porosity is preferably determined by means of the Archimedes method or by means of quantitative image analysis. When determining the porosity values by means of quantitative image analysis, a metrological adjustment is preferably effected by means of the Archimedes method mentioned above.

According to the invention, it is possible to combine the advantages of the porosity of a body (low dead mass, low material consumption, cost-effective production) with a higher material density (lower porosity) of the body merely at the required regions. According to the invention, these regions are located at least where one or more sealing elements are also to be arranged. The seating base preferably forms a mechanical contact surface for the sealing element.

In the depth region, a closed porosity is provided in particular as the locally relatively low porosity. As a result of this, the seal is effectively promoted in the case of powder-metallurgical bodies in the region of a conventional sealing element.

In a preferred embodiment, the locally relatively dense region (i.e. the depth region having a locally relatively low porosity) has a material depth of at least 0.01 mm or at least 0.05 mm. The material depth is usually determined proceeding from the seating base. In preferred embodiments, the material depth is up to 0.5 mm, up to 1.0 mm, up to 1.5 mm, up to 2.0 mm or up to 2.5 mm. Given a material depth of less than 0.01 mm or 0.05 mm (depending on the use), it may not be ensured that the powder-metallurgical body has the desired imperviousness for supporting the sealing element in the depth region. Above a material depth of 2.5 mm, the procedural outlay for achieving the desired, locally relatively high density or locally relatively low porosity may be relatively high, without an additional benefit required in terms of the sealing action being obtained in the process.

The depth region is preferably represented in a transverse microsection as a cross-sectional area, which is formed as the product of the material depth and a material width extending in particular parallel to the seating base. The material width is preferably dimensioned in such a manner that it is less than or equal to the width of the seating base. The cross-sectional area considered is in particular at least 0.3 mm$^2$. This cross-sectional area represents e.g. a field to be considered having a material depth of 0.5 mm and a material width of 0.6 mm.

In order to promote the sealing action in the region of the seating base, the following embodiments are preferred for the relationship between the material depth and the porosity:

Given a material depth of up to 0.05 mm, the mean porosity in the depth region is at most 4% by volume (corresponding to at least 96% of the theoretical density), preferably at most 2.5% by volume (corresponding to at least 97.5% of the theoretical density). Given a material depth of up to 0.5 mm, the mean porosity in the depth region is at most 5% by volume, preferably at most 2.5% by volume. Given a material depth of up to 1.0 mm, the mean porosity in the depth region is at most 6% by volume, preferably at most 3% by volume. Given a material depth of up to 1.5 mm, the mean porosity in the depth region is at most 7% by volume, preferably at most 3.5% by volume.

The porosity values indicated are preferably determined using the quantitative image analysis method (metallography).

The mean porosity in the depth region is preferably at most 5% by volume. If the mean porosity in the depth region is above 5% by volume, the desired imperviousness to gases and liquids may not be ensured. Outside the depth region, it is not necessary for the body to be impervious to fluids/gases, and therefore the mean porosity there (e.g. above 10% by volume) can correspond to that of a conventional powder-metallurgical component.

The seating base is preferably a constituent part of a sealing groove for receiving the sealing element, as a result of which the sealing element can be fixed in a technically simple manner on the powder-metallurgical body. The seating base is arranged in particular on a groove base of the sealing groove. In particular, the seating base is formed continuously in a circumferential direction of the powder-metallurgical body. It is thereby possible for the seating base to correspond, for example, to annular sealing elements, as are often used in connection with an effective sealing of components.

The powder-metallurgical body preferably has a body axis (e.g. axis of symmetry or axis of rotation). The seating base, or the groove base of the sealing groove, lies in particular in a plane arranged transversely to the body axis. The body preferably has an annular form.

The locally relatively low porosity or locally relatively high density is preferably realized in combination with a sealing groove arranged in the region of a front end of the powder-metallurgical body. In the region of the front ends or also at other locations, the wall segments of the powder-metallurgical body which surround a sealing element often have relatively thin dimensions. In terms of the undesirable lack of imperviousness of the body, these locations can be the most critical. The risk of there being a lack of imperviousness at these locations is avoided in a technically simple manner by means of the remachined material elevation.

In certain technical applications, the sealing of powder-metallurgical components against the penetration and/or escape of gases and liquids (e.g. oil) is of major importance, in particular in the mechanical engineering sector and in the automotive sector. The powder-metallurgical components are e.g. rotors and stators of camshaft adjuster systems. By way of example, imperviousness to swashing oil or to oil pressures in the order of magnitude of 1 to 10 bar is required. For improved sealing, it is possible to combine conventional sealing elements arranged on these components with a locally relatively low porosity of the powder-metallurgical component in the region of the seating base, i.e. in the depth region.

With the aid of the material elevation provided, it is possible to provide individual regions of the powder-metallurgical body with a locally relatively low porosity in a targeted manner by means of suitable tools and method steps. The machining of the material elevation brings about local redensification in a depth region with a material depth proceeding from the seating base after the machining. The local redensification of individual regions also has the advantage that redensification of the entire powder-metallurgical body, which involves more outlay in terms of procedure and costs, as proposed for example in DE 20 2008 001 976 U1, is avoided.

The sealing element is seated on the seating base in particular after the material elevation has been machined.

The material elevation is preferably flattened by the machining, i.e. the thickness of the material elevation after the machining is flatter or eliminated completely, in such a manner that a material elevation is no longer present. This flattening process advantageously brings about the desired compression or relatively low porosity in the depth region.

For the local machining, use is made of a suitable tool for achieving the redensification. The redensification is preferably effected in the form of a specific calibration operation or pressing operation. For this purpose, use is made in particular of tools which are present as standard anyway, as a result of which the local redensification can be achieved in a particularly cost-effective manner. In a preferred embodiment, calibration pressing is suitable for the calibration operation. Alternatively, the redensification is effected by means of calibration rolling.

In this case, the tool for the redensification is preferably transported parallel to the body axis already mentioned above and acts with a force or applied pressure oriented in the direction of transport on a surface of the seating base or of the material elevation arranged, in particular, transverse to the direction of transport. In the case of a pressing operation, here the direction of transport corresponds to the pressing direction. As an alternative or in addition to the transportation of the tool, the body can also be transported in the direction of the tool.

It is preferable for a plurality of seating bases to be present on the powder-metallurgical body. If, for example, there is a respective seating base arranged at two opposing sides (e.g. front ends) of the body, it is advantageously possible for corresponding parts of a suitable redensification tool to be transported toward one another from two sides of the body and to simultaneously carry out the redensification in the region of the two seating bases, such that the respectively opposite tool part can act as an anvil on one side of the body in a manner which is simple in terms of process engineering during the redensification.

In a preferred embodiment, the body together with the material elevation is provided as a powder-metallurgical blank. This avoids additional complex method steps for realizing the material elevation by the supply of material on the blank, for example, after the blank has been sintered.

The body is preferably machined locally in the region of the material elevation only after the pressed green compact has been sintered. Since calibration of the sintered body is often provided anyway after the sintering, the calibration of the body and the machining of the material elevation can preferably be effected in a single method step so as to save time and reduce costs.

It is preferable for the machining of the material elevation to also be followed by at least one further method step, in which the pores on the surfaces of the powder-metallurgical body are at least partially sealed. This sealing of the surfaces of the body promotes the desired imperviousness of the body to fluids/gases and is preferably effected by coating or minimizing the pores with a layer of magnetite, which can also serve as protection against corrosion and for increasing the surface hardness. In a further embodiment of the sealing, the pores are impregnated with a plastic. In a further embodiment of the sealing, the body is firstly treated with steam as described above and then impregnated with the plastic.

The text which follows explains the invention in more detail on the basis of drawings and a production example:

BRIEF DESCRIPTION OF THE SEVERAL VIEWS OF THE DRAWING

FIG. 4 shows an optical micrograph of a solid body section of a ready-to-press mixed powder (iron, copper, carbon, pressing aid) after sintering, without a material elevation and without redensification in the region of the groove base, FIG. 5 shows an enlarged micrograph of detail V shown in FIG. 4, FIG. 6 shows an optical micrograph of a solid body section of the powder mixture according to FIG. 4 after sintering, but with redensification in the region of the groove base, FIG. 7 shows an enlarged micrograph of detail VII shown in FIG. 6.

DETAILED DESCRIPTION OF THE INVENTION

Figure 1:
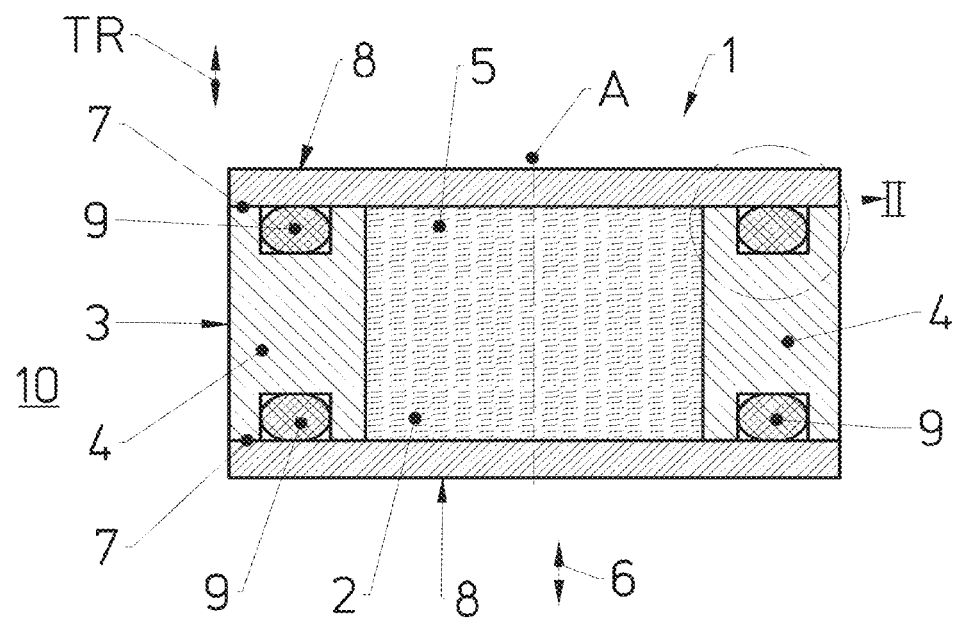
FIG. 1 is a schematic, sectioned side view of a powder-metallurgical body with attachment parts and sealing elements.

The sealing of an apparatus 1 against the escape of liquid 2 (e.g. oil) will be explained on the basis of FIG. 1 and FIG.

2. The apparatus 1 comprises a body 3 which has been produced by powder metallurgy and has a continuous side wall 4 in the circumferential direction of the body 3. The side wall 4 delimits an inner space 5. The liquid 2 is located in the inner space 5. An attachment plate 8 is arranged on each of the end sides 7 of the body 3 which lie opposite one another in the axial direction 6. The attachment plates 8 are mounted (e.g. screwed) on the body 3 using suitable fastening means (not illustrated here) and close off the inner space 5 in the axial direction 6. Sealing elements in the form of two elastically deformed sealing rings 9 which are each continuous are intended to prevent the liquid 2 from passing from the inner space 5 into the outer environment 10 in the transition regions between the attachment plates 8 and the body 3.

Figure 2:
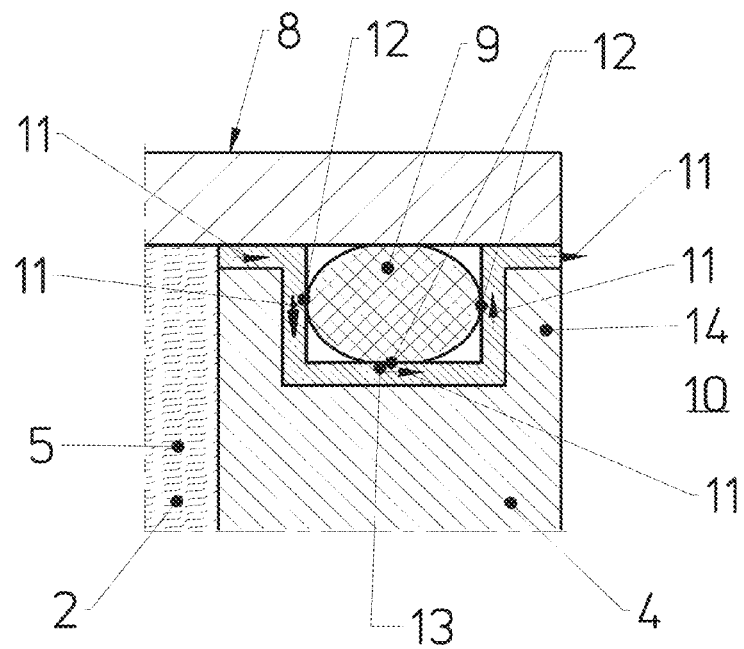
FIG. 2 is an enlarged illustration of detail II shown in FIG. 1.

In order to prevent liquid 2 from penetrating through the side wall 4, the body 3 is sealed. For this purpose, it is preferably impregnated with a plastic. The impregnation is effected by immersing the porous body 3 in the liquid impregnation medium at negative pressure, in which case the impregnation medium penetrates into the pores of the body 3. After the body 3 has been removed from the impregnation medium, excess impregnation material is rinsed off and the impregnation medium in the pores cures to form a solid mass, as a result of which the imperviousness to fluid is obtained. Method conditions mean that impregnation medium can undesirably be washed out during the rinsing-off process. Particularly in edge regions and/or in regions of the body 3 where the wall thickness is small, there is the risk in this respect that the body 3 is not sufficiently sealed or remains pervious, and therefore a pervious channel is formed. Such a channel is indicated in FIG. 2 by means of the arrows 11. It is located in the region of contact surfaces 12 of the porous body 3, against which the sealing element 9 rests in an elastically deformed manner.

In order to avoid such a pervious channel, a local reduction in porosity is provided in a depth region 13 of a contact surface 12 for the sealing element 9.

FIG. 3, again in enlarged form, shows a sealing groove 15 of the porous body 3 for receiving a sealing element (not illustrated here). Provision is made of a seating base 16 (it corresponds to a contact surface 12 in FIG. 2), which is a constituent part of a groove base 17 of the sealing groove 15. In the assembled state, the sealing element is seated on the groove base 17 or on the seating base 16. The sealing element may also be seated on the lateral groove flanks 18. The groove flanks 18 can therefore likewise each form a seating base or contact surface.

The seating base 16 is provided with a material elevation 19. In a manner which is still to be explained, the material elevation 19 is machined by means of a redensification tool W which is moved in a direction of transport P parallel to a body axis A (and is only illustrated schematically here), in such a manner that, following the machining on the seating base 16, the adjoining depth region 13 has a locally much lower porosity than a region remote therefrom (e.g. region 14). The mean porosity of the depth region 13 is then also much lower than the mean porosity of the body 3 as a whole. The material depth T, extending in the depth direction TR, of the region 13 with the locally relatively low porosity can vary here depending on the technical application and profile of requirements of the body 3.

Figure 3:
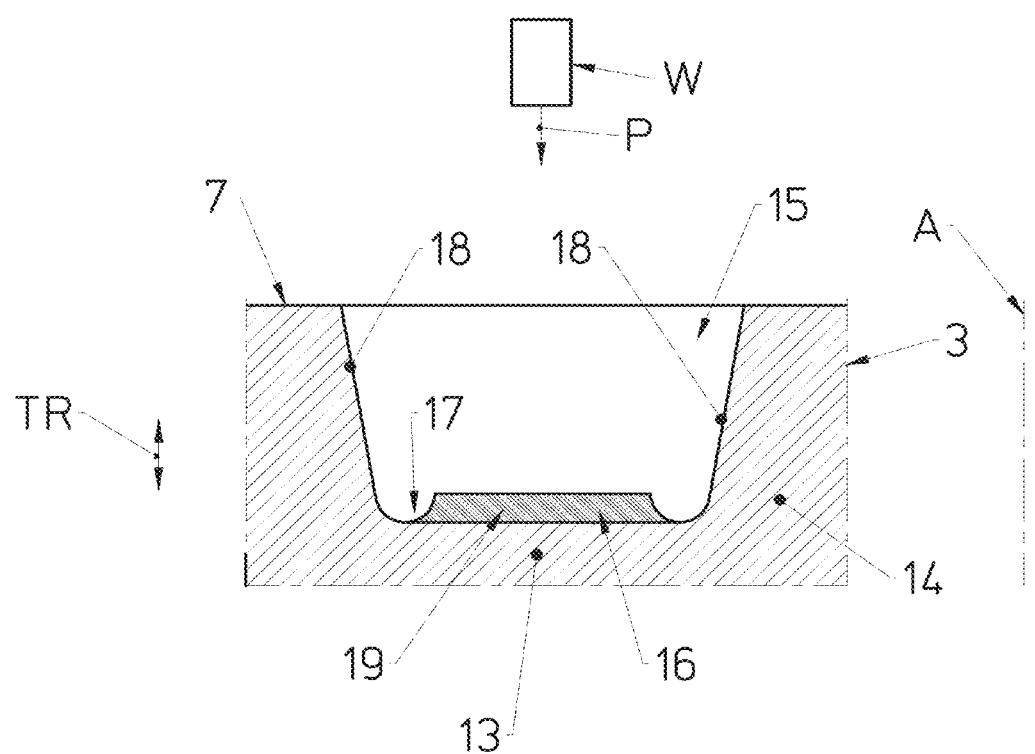
FIG. 3 is a schematic, sectioned side view of a sealing groove with a material elevation.

In FIG. 3, the body 3 is illustrated only in part. It is formed continuously in the circumferential direction, the circumferential plane being arranged at right angles to the body axis A. The plane of the machined seating base 16 or the surface thereof likewise extends substantially transversely or at right angles to the body axis A (see FIG. 6). The sealing groove 15 is located in the region of a front end 7 of the body 3. The sealing groove 15 is likewise continuous for receiving a—preferably elastic—annular seal as the sealing element. Accordingly, the seating base is also formed continuously, e.g. as an annular surface, in the circumferential direction of the body 3. It is also possible for a plurality of sealing grooves 15—be they continuous in the circumferential direction of the body 3 or not—to be provided on the body 3. In particular, the body 3 has a second sealing groove 15 arranged so as to lie opposite the sealing groove 15 shown in the depth direction TR (see also FIG. 1).

The text which follows describes the production of a porous body 3 with a locally relatively low porosity or locally relatively high density in the depth region 13 on the basis of an example.

A metal powder mixture of copper (1 to 1.5% by weight), graphite (0.45 to 0.65% by weight), manganese sulfide (0.3 to 0.4% by weight), microwax (0.75 to 0.85% by weight), remainder iron was pressed to form a green compact at an applied pressure of 380 MPa. The pressing tool was designed in such a manner that the material elevation 19 on the sealing groove 15 was also shaped and pressed. This green compact provided was then sintered in a through-type belt kiln at 1120° C. under endothermic gas for 20 minutes. After sintering, the material elevation 19 of the sintered body 3 was machined by means of calibration pressing with an applied pressure of 700 MPa and flattened and thereby locally redensified (see the optical micrographs shown in FIG. 6 and FIG. 7). The redensification tool used for calibration pressing (which corresponds in principle to the tool W shown schematically) was transported here in the direction of transport P, i.e. parallel to the body axis A, in the direction of the seating base 16 or the material elevation 19, and flattened the material elevation 19. On account of this redensification, the depth region 13 had a much lower porosity than regions 14 of the porous body 3 which were remote therefrom and were not redensified. Similarly, the depth region 13 shown in FIG. 6 and FIG. 7 had a much lower porosity than the corresponding regions of a body of identical construction without this local remachining or redensification in the region of the seating base 16 (see the depth region 13 in FIG. 4 and FIG. 5).

The porosity profile along the material depth T was determined by means of quantitative image analysis (sum of the pore surfaces in relation to the overall surface considered). Pores having a pore size <6 μm were not taken into account in the measurements. The measurements were carried out on polished surfaces of a transverse microsection with 200-fold magnification (fully automatic optical microscope LEICA DM 4000-M with image analysis program from Clemex Vision). The cross section for the microsection was effected by means of a conventional cutting apparatus and SiC cut-off wheels. The cross section was ground in a plurality of steps with a differing grain size (80 to 1200). This transverse microsection was also subjected to final polishing by means of a polishing pad. Here, the polishing pad was sprayed with an alcohol suspension containing diamond grains (grain diameter 1 to 3 μm).

For the measurements, the region of the porous body 3 to be investigated was divided into a grid. Proceeding from the seating base 16, five successive portions each having a material depth of 0.5 mm were defined along the material depth T. Each portion comprised two subfields F1 and F2, which were arranged on both sides of a defined groove center line 20. Each subfield F1, F2 had a field width or material width B oriented in the width direction BR of 0.6 mm. The width direction BR is arranged at right angles to the material depth T and, in FIG. 6, extends parallel to the groove width of the sealing groove 15. The grid consequently comprised two columns each with five subfields, each subfield having a cross-sectional area of 0.6 mm by 0.5 mm.

The porosity values determined in the case of a first porous body 3 with local redensification can be gathered from table 1. For material depths >0.5 mm, the porosity values for field 1 are given in each case as a mean value, which results from the porosity values in the corresponding subfields F1. Example:

Porosity field 1 (where T=0–0.5 mm)=0.76% by volume, identical to porosity subfield F1 (where T=0–0.5 mm).

Porosity subfield F1 (where T=0.5–1.0 mm)=1.56% by volume. This results in porosity field 1 (where T=0–1.0 mm)=(0.76+1.56 by volume)/2=1.16% by volume.

The porosity values for field 2 were determined analogously proceeding from the porosity values in subfields F2.

Since the pores of the body 3 had no preferred orientation, the area-related porosity determined substantially also corresponds to the volume-related porosity.

TABLE 1

| | Material depth T in mm | | | | |
| --- | --- | --- | --- | --- | --- |
| | 0-0.5 | 0-1.0 | 0-1.5 | 0-2.0 | 0-2.5 |
| Field 1, porosity in % by volume | 0.76 | 1.16 | 1.81 | 2.36 | 2.85 |
| Field 2, porosity in % by volume | 1.00 | 1.54 | 1.80 | 2.49 | 3.36 |
| Mean value of the porosity from field 1 and field 2 in % by volume | 0.88 | 1.35 | 1.81 | 2.43 | 3.11 |

The porosity values determined in the case of a second porous body 3 with local redensification can be gathered from table 2. The values were determined analogously to the procedure in table 1.

TABLE 2

| | Material depth T in mm | | | | |
| --- | --- | --- | --- | --- | --- |
| | 0-0.5 | 0-1.0 | 0-1.5 | 0-2.0 | 0-2.5 |
| Field 1, porosity in % by volume | 1.52 | 1.68 | 2.07 | 2.5 | 3.21 |
| Field 2, porosity in % by volume | 1.72 | 2.16 | 2.31 | 2.72 | 3.29 |
| Mean value of the porosity from field 1 and field 2 in % by volume | 1.62 | 1.92 | 2.19 | 2.61 | 3.25 |

On the basis of the measurements, it is apparent that the porosity in the depth region 13 increases proceeding from very low values at the seating base 16 as the material depth T increases.

It should be pointed out that details shown in the drawings are not necessarily true to scale. For example, the limits of details V and VII shown in FIG. 4 and FIG. 6 and also the lengths of the arrows shown in relation to the material depth T, the material width B and the subfields F1, F2 are not necessarily true to scale, despite the information relating to the scale which can be seen in FIG. 4 to FIG. 7.

The invention claimed is:

1. A method of producing a powder-metallurgical body to be sealed by way of a sealing element, the method which comprises:

providing a seating base of the body for receiving and seating the sealing element, wherein the seating base has a material elevation;

machining the material elevation to cause the body to be redensified, after the machining, in a depth region of the seating base and to cause the depth region to have a lower mean porosity than a porosity of the body as a whole; and seating the sealing element on the seating base after the material elevation has been machined.

2. The method according to claim 1, wherein the machining step comprises flattening the material elevation.

3. The method according to claim 1, wherein the machining step comprises machining the material elevation by calibration pressing.

4. The method according to claim 1, which comprises providing the body together with the seating base and the material elevation as a powder-metallurgical blank.

5. The method according to claim 4, which comprises sintering the powder-metallurgical blank and subsequently machining the material elevation.

6. The method according to claim 1, which comprises sealing pores on the surfaces of the body at least partially after the material elevation has been machined.

7. The method according to claim 6, which comprises sealing the pores by impregnation with a plastic.

8. The method according to claim 1, which comprises forming the body with a closed porosity in the depth region.

9. The method according to claim 8, which comprises forming the closed porosity exclusively in the depth region.

10. The method according to claim 1, which comprises, given a material depth proceeding from the seating base of up to 0.05 mm, forming the depth region with a mean porosity of at most 4%.

11. The method according to claim 10, which comprises forming the depth region with a mean porosity of no more than 2%.

12. The method according to claim 1, which comprises, given a material depth proceeding from the seating base of up to 0.5 mm, forming the depth region with a mean porosity of at most 5%.

13. The method according to claim 12, which comprises forming the depth region with a mean porosity of no more than 2.5%.

14. The method according to claim 1, which comprises, given a material depth proceeding from the seating base of up to 1.0 mm, forming the depth region with a mean porosity of at most 6%.

15. The method according to claim 14, which comprises forming the depth region with a mean porosity of no more than 3%.

16. The method according to claim 1, which comprises, given a material depth proceeding from the seating base of up to 1.5 mm, forming the depth region with a mean porosity of at most 7%.

17. The method according to claim 16, which comprises forming the depth region with a mean porosity of no more than 3.5%.

18. The method according to claim 1, which comprises forming the seating base to extend continuously in a circumferential direction of the body.

19. The method according to claim 1, which comprises forming the seating base as a constituent part of a sealing groove for receiving the sealing element.

20. The method according to claim 19, which comprises forming the seating base as a constituent part of a groove base of the sealing groove.

21. The method according to claim 19, which comprises forming the sealing groove in a region of a front end of the body.

22. The method according to claim 1, which comprises seating the sealing element on the machined material elevation of the seating base.

23. A method of producing a powder-metallurgical body to be sealed by way of a sealing element, the method which comprises:
   providing a seating base of the body for receiving and seating the sealing element with a material elevation;
   machining the material elevation to cause the body to be redensified, after the machining, in a depth region of the seating base and to cause the depth region to have a lower mean porosity than a porosity of the body as a whole;
   sealing pores on the surfaces of the body at least partially after the material elevation has been machined; and
   seating the sealing element on the seating base.

* * * * *